M. IHNAT.
FENDER.
APPLICATION FILED DEC. 19, 1916.

1,238,677.

Patented Aug. 28, 1917.
2 SHEETS—SHEET 1.

Witnesses
Hugh H. Ott
P. M. Smith

Inventor
Michael Ihnat,
By Victor J. Evans
Attorney

M. IHNAT.
FENDER.
APPLICATION FILED DEC. 19, 1916.

1,238,677.

Patented Aug. 28, 1917.
2 SHEETS—SHEET 2.

Witnesses
Hugh H. Ott
R. M. Smith

Inventor
Michael Ihnat,
By Victor J. Evans
Attorney

UNITED STATES PATENT OFFICE.

MICHAEL IHNAT, OF PLEASANT CITY, OHIO.

FENDER.

1,238,677.  Specification of Letters Patent.  Patented Aug. 28, 1917.

Application filed December 19, 1916. Serial No. 137,844.

*To all whom it may concern:*

Be it known that I, MICHAEL IHNAT, a citizen of the United States, residing at Pleasant City, in the county of Guernsey and State of Ohio, have invented new and useful Improvements in Fenders, of which the following is a specification.

This invention relates to fenders especially designed for use in connection with automobiles and similar motor vehicles, the object in view being to produce a fender which is hinged to and supported partially by the front axle of the machine and in connection with which flexible means are employed for raising and lowering the fender or moving the same to and from its operative and elevated positions, the raising and lowering means being within easy access of the operator of the machine who may thereby raise and lower the fender without moving from his operating position, means also being employed for locking the fender in its elevated position.

With the above and other objects in view, the invention consists in the novel construction, combination and arrangement of parts, as herein described, illustrated and claimed.

In the accompanying drawings:—

Fig. 2 is an interior perspective view of a portion of an automobile looking toward the dash and showing the fender operating and locking means.

Figure 1:
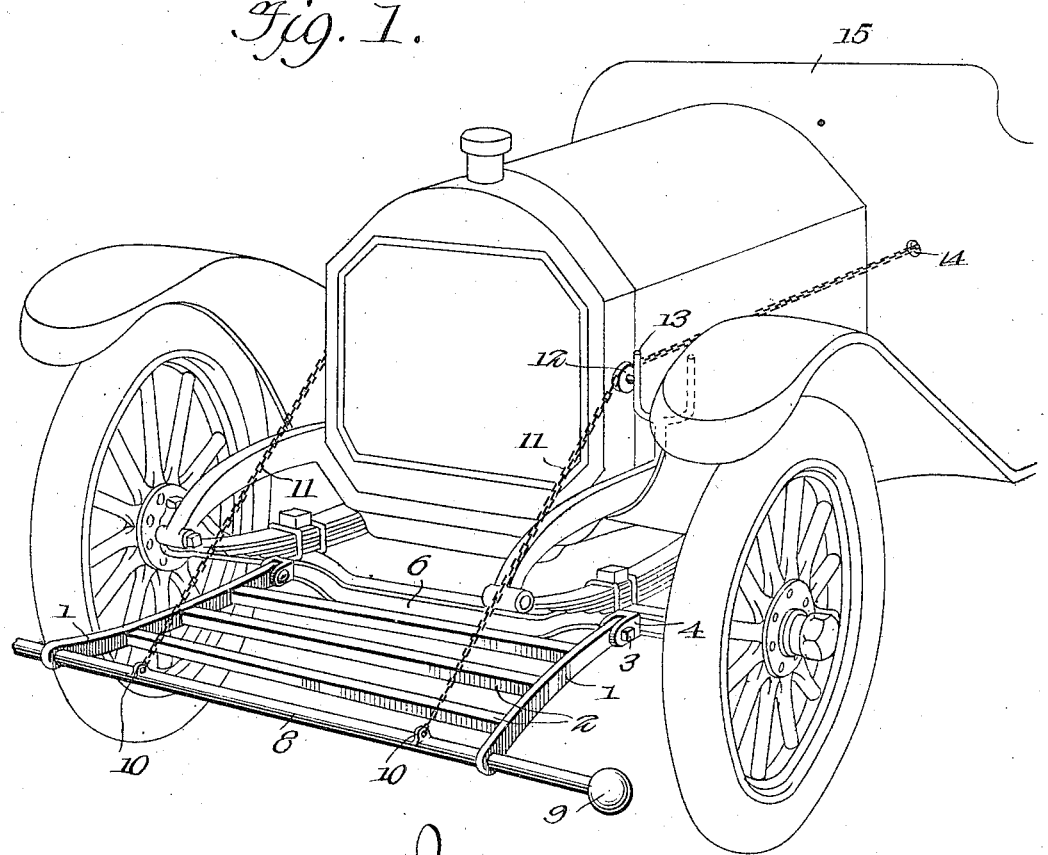
Figure 1 is a perspective view of a sufficient portion of an automobile to illustrate the fender of this invention in its applied relation thereto.
Figure 3:
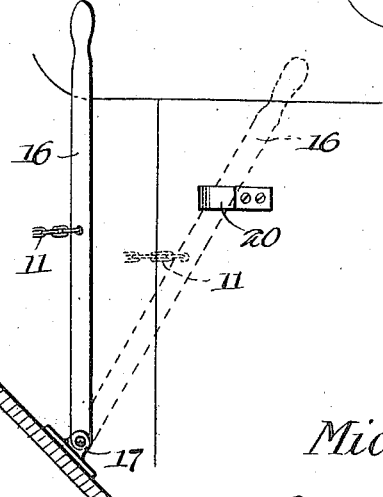
Fig. 3 is a fragmentary elevation showing the two positions of the fender operating lever.
Figure 3:
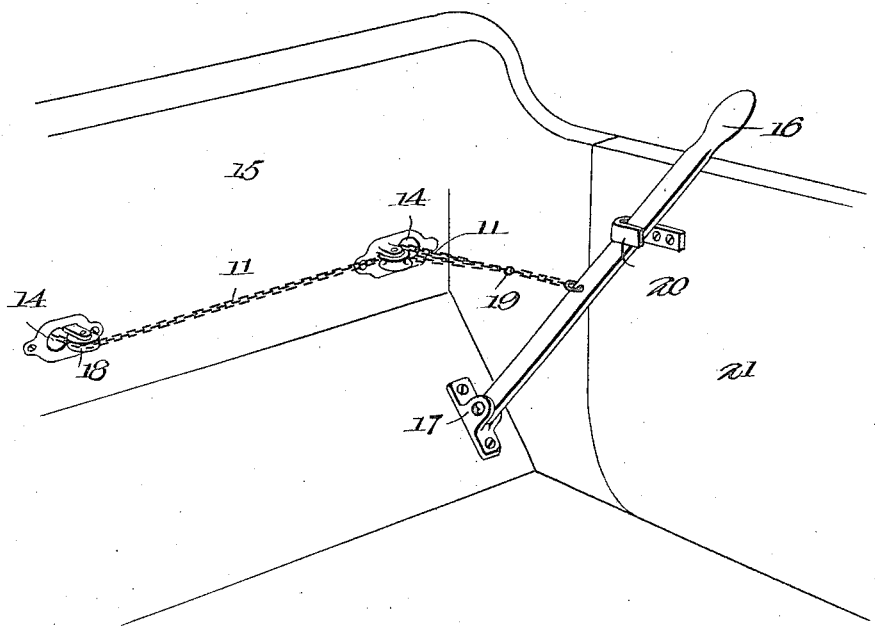
Figure 4:
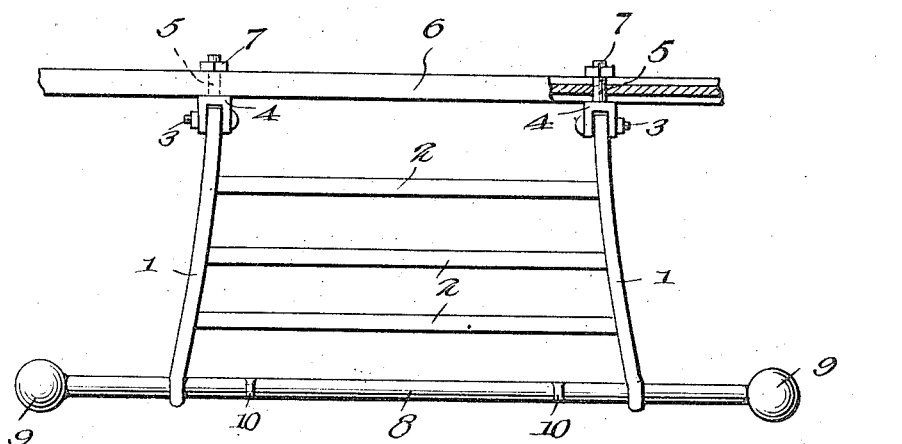
Fig. 4 is a plan view of the fender.

The fender body contemplated in this invention, in a simple and preferred embodiment thereof, comprises a pair of side bars 1 connected by any desired number of cross bars or slats 2, said parts being rigidly fastened together.

The bars 1 are pivotally mounted at their rear extremities on bolts 3 or the equivalent thereof carried by shackles 4 the shanks 5 of which are shown as inserted through openings in the front axle 6 of the machine and secured in place by means of nuts 7. Other means may, however, be employed for pivotally connecting the fender frame to the front axle of the machine. The free extremities of the side bars or arms 1 carry a pilot bar 8 preferably having knobs 9 at the opposite extremities thereof.

The pilot bar 8 is provided with eyes 10 to which are attached the forward extremities of a pair of raising and lowering chains or flexible connections 11. These flexible connections 11 extend from the pilot bar 8 upwardly and rearwardly around the guiding sheaves or pulleys 12 which are journaled on stud shafts having a fixed relation to the lamp brackets 13 located at opposite sides of the radiator of the machine. The connections 11 then extend farther rearwardly where they pass through openings 14 in the dash 15. The fender operating lever 16 is shown as pivotally connected to a bracket 17 fastened to the dash in a low down position as shown in Fig. 2. One of the chains, or that chain on the same side of the machine as the lever 16, is attached at its rear extremity directly to said lever while the other chain or flexible connection 11 passes around a guide pulley 18 in one of the openings 14 as shown in Fig. 2 and then horizontally across the rear side of the dash 15 where it is fastened at 19 to the other chain. Therefore, when the lever 16 is drawn rearwardly by the operator, both flexible connections 11 are equally acted upon with the result that the fender is moved from its lower or catching position to its elevating position where it is substantially on a horizontal line with the axle 6.

When the lever 16 is in its fender raising position, it is placed in engagement with a retaining hook 20 which is shown as fastened to one of the front side doors 21 of the body of the machine. When the fender is in its lowered or catching position, the lever 16 rests against or in close proximity to the dash 15.

When the fender is lowered, it serves to prevent persons and objects from passing beneath the body of the machine and being injured thereby. Normally, the fender may be carried in its elevated position and lowered whenever an accident is anticipated. In out of town work, as in the open country, the fender will usually be carried in its elevated position where, as above stated, the pilot bar 8 is substantially on a level with the front axle 6 of the machine. By reason of the construction of the fender, the same may be readily applied to almost any make of motor vehicle now in common use.

Changes in the form, proportion and minor details of construction may be resorted to without departing from the principle or sacrificing any of the advantages of the invention.

Having thus described my invention, I claim:—

The combination with the front axle of a motor vehicle, of a fender frame embodying side bars arranged in spaced relation to each other and pivotally supported at their rear extremities on said axle, a pilot bar carried by the free ends of said frame bars, cross bars rigidly connecting said side frame bars, flexible connections attached at their forward extremities to said pilot bar, guiding sheaves journaled on the lamp carrying brackets of the machine, guide pulleys journaled in openings in the dash around which one of said flexible connections passes, a manually operable lever to which said flexible connections are attached in rear of the dash, and a retaining hook for holding said lever in its fender raising position.

In testimony whereof I affix my signature in presence of two witnesses.

MICHAEL IHNAT.

Witnesses:
C. H. BREIDENTTAL,
J. W. JOHNSON.

Copies of this patent may be obtained for five cents each, by addressing the "Commissioner of Patents, Washington, D. C."